Sept. 24, 1963 J. J. O'CONNELL 3,104,533
REFRIGERATING APPARATUS

Filed April 24, 1961 8 Sheets-Sheet 1

INVENTOR.
John J. O'Connell
BY
Carl A. Stickel
HIS ATTORNEY

INVENTOR.
John J. O'Connell

Sept. 24, 1963        J. J. O'CONNELL         3,104,533
                   REFRIGERATING APPARATUS
Filed April 24, 1961                     8 Sheets-Sheet 3

INVENTOR.
John J. O'Connell
BY
Carl A. Stickel
HIS ATTORNEY

INVENTOR.
John J. O'Connell
BY
HIS ATTORNEY

Sept. 24, 1963 J. J. O'CONNELL 3,104,533
REFRIGERATING APPARATUS
Filed April 24, 1961 8 Sheets-Sheet 6

INVENTOR.
John J. O'Connell
BY
Carl A. Stickel
HIS ATTORNEY

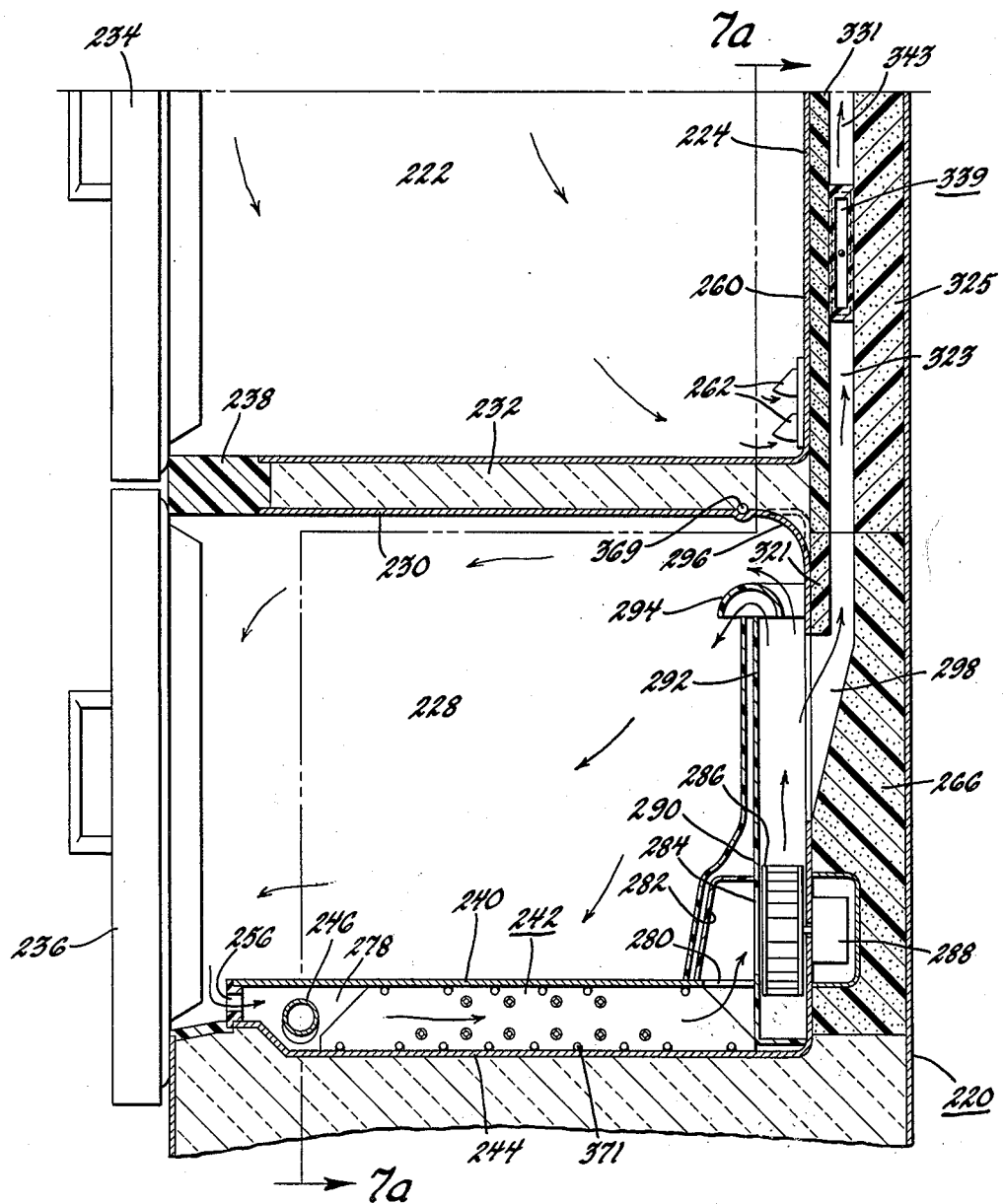

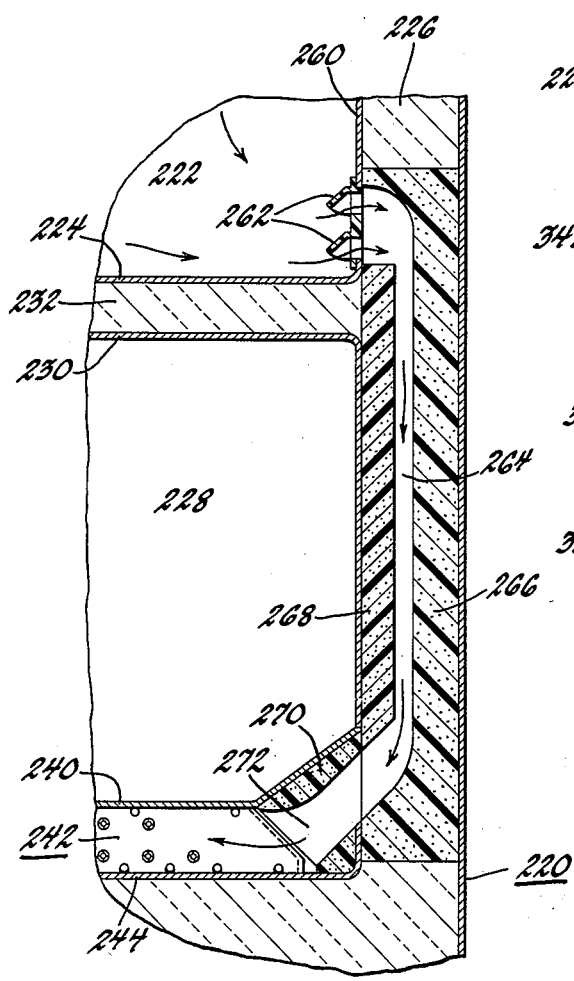
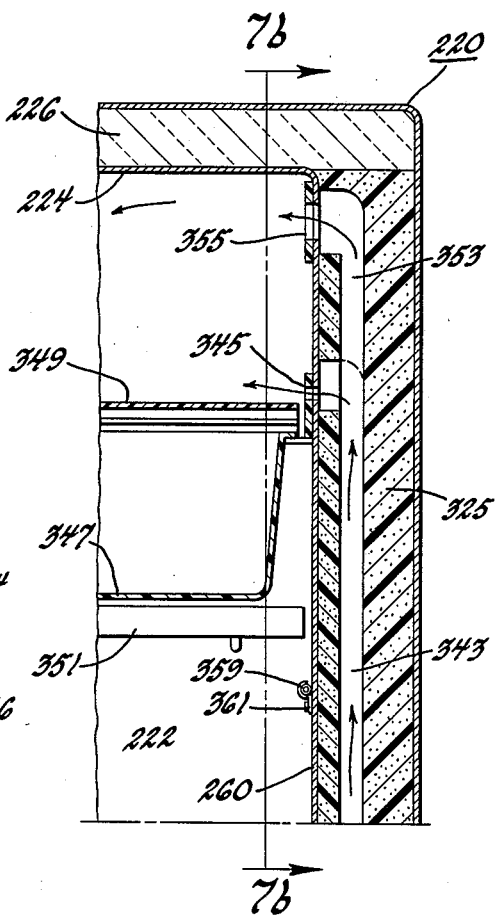
Fig. 9
Fig. 8b

3,104,533
REFRIGERATING APPARATUS
John J. O'Connell, Dayton, Ohio, assignor to General Motors Corporation, Detroit, Mich., a corporation of Delaware
Filed Apr. 24, 1961, Ser. No. 105,004
5 Claims. (Cl. 62—419)

This invention relates to refrigerating apparatus and more particularly to household refrigerators with above and below-freezing compartments in which frost will not collect.

Refrigerators that are free of frost are popular. Because of the high sale price, they are limited to those having larger incomes. This is partially caused by the fact that these frost-free refrigerators have been built with separate evaporators for each compartment. Attempts have been made to cool both compartments with a single evaporator. However, the rapid accumulation of frost from the air received from the above-freezing compartment caused the evaporator air spaces to become rapidly clogged with frost so as to prevent the proper circulation of air between the compartments and the evaporator. This required very frequent defrosting. Furthermore, because of the relatively large accumulation of frost where the circulating air first contacted the evaporator, it was difficult to defrost the evaporator rapidly enough to prevent the below-freezing compartment temperature from rising an undesirable amount.

It is an object of this invention to provide an arrangement in which a single evaporator cools the below and above-freezing compartments by circulating the air in such a way that the air from the below and the above-freezing compartments each initially contact the evaporator at different places to distribute the frost formation and to prevent obstruction to the air flow and to make possible rapid and complete defrosting.

It is another object of this invention to provide a refrigerator arrangement in which a single evaporator cools the below and above-freezing compartments in which the air is circulated in such a way that the air from the above-freezing compartment is passed along one side of the evaporator to remove the greater portion of the moisture from it before it joins the below-freezing compartment circulating air in heat transfer with the remainder of the evaporator to prevent the obstruction of the air flow and to make possible rapid and complete defrosting.

It is another object of this invention to provide a single evaporator arrangement to provide more space for the collection of frost in the part first contacted by the above-freezing compartment air.

It is another object of this invention to provide an improved thermostatic valve control arrangement for regulating the flow of cold air to the above-freezing compartment.

It is another object of this invention to provide a simple improved duct arrangement which minimizes undesired heat transfer for the circulating air between the above-freezing and the evaporator compartments.

It is another object of this invention to provide an evaporator and duct arrangement in which frosting in the duct arrangement is minimized and in which all the frost is removed by defrosting the evaporator.

These and other objects are attained in the top freezer and bottom freezer forms of frost-free refrigerators shown in the drawings. In each of these forms, a single refrigerant evaporator is formed of serpentine-shaped refrigerant tubing provided with a middle section of closely spaced transverse fins and end sections of wider spaced transverse fins. This evaporator is located beneath the false sheet metal bottom wall of the below-freezing compartments. This false wall at the front is provided with an air entrance only in front of the middle section of the evaporator.

In the top freezer form, air from the above-freezing compartment below is drawn between the false top wall and the insulation above it to the rear corners of the cabinet from which it is fed upwardly into the evaporator compartment and passes through the wider spaced finned edge portions of the evaporator to the front where it joins the cold air from the below-freezing compartment for passage rearwardly through the closely spaced finned middle portion of the evaporator. In the bottom freezer model, air from the lower rear corners of the above-freezing compartment passes downwardly through ducts formed within a separate slab of rigid insulation onto the rear bevelled edges of the wider spaced fins of the evaporator.

The cooled mixed air is drawn from the rear of the middle portion of the evaporator into the inlet of a centrifugal fan. This fan has one central outlet discharging upwardly at the center of the back of the below-freezing compartment. In the top freezer model, the fan has a second outlet discharging downwardly at an angle connecting with a duct formed in a rigid insulation piece extending to a valve having an operating bellows and a control spring located in the insulation space. The outlet of the valve discharges directly into the above-freezing compartment and is provided with deflectors for deflecting the air onto the top and the rear of the meat tender therein. The operating bellows of the valve is connected by a capillary tube to a thermostat bulb located in the rear of the above-freezing compartment beneath one of the shelves thereof. In the bottom freezer model, the upwardly extending outlet is split so as to provide a rear portion connecting with a passage, located in rigid insulation pieces, containing a thermostatically-controlled valve and extending to an outlet directly over the meat tender and to a second outlet located in the top center of the rear wall of the above-freezing compartment. To minimize heat infiltration and air and gas leakage, the ducts in the insulation are lined with bright metal foil.

Further objects and advantages of the present invention will be apparent from the following description, reference being had to the accompanying drawings wherein preferred embodiments of the present invention are clearly shown.

Figure 7A:
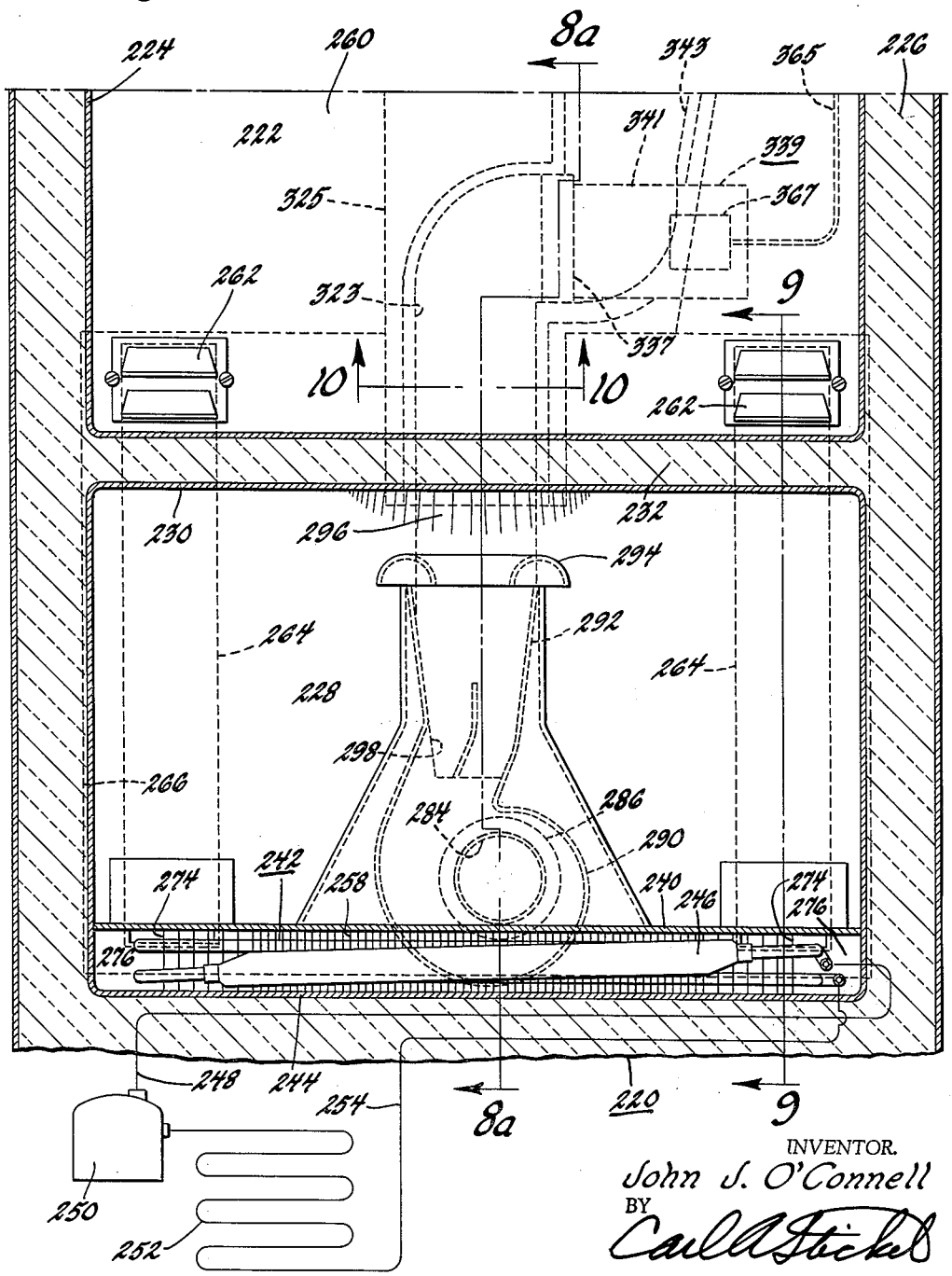
Figure 7B:
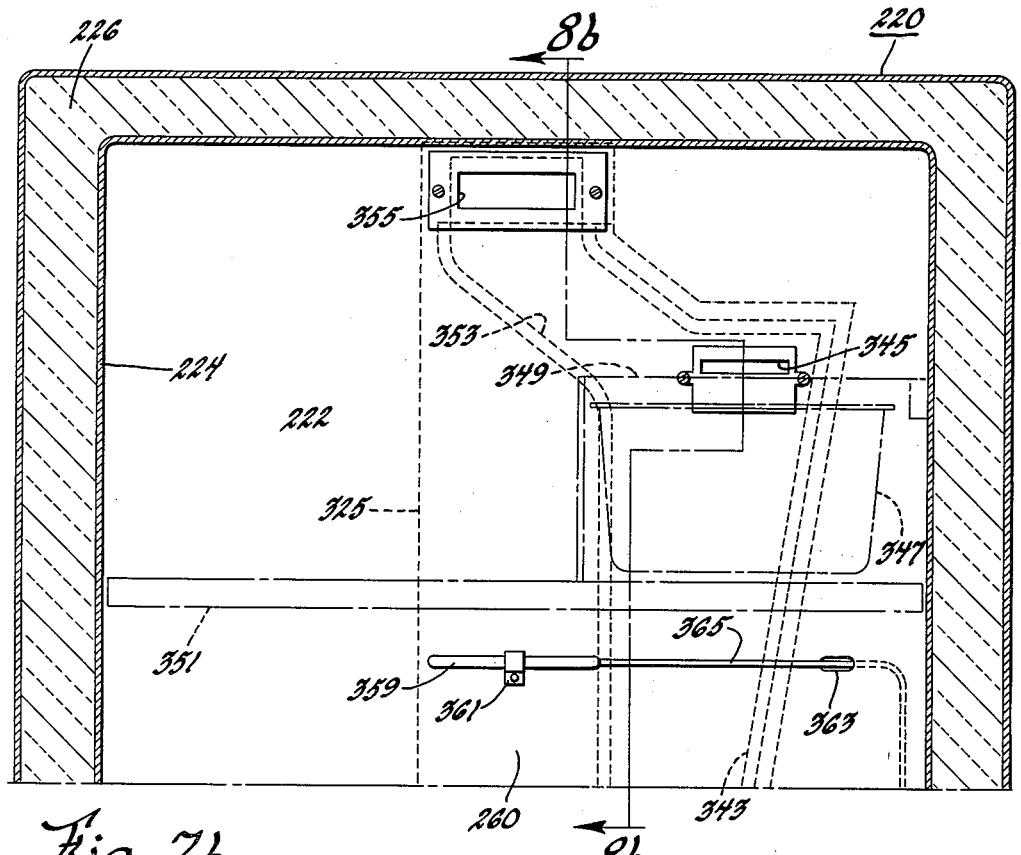
Figure 10:
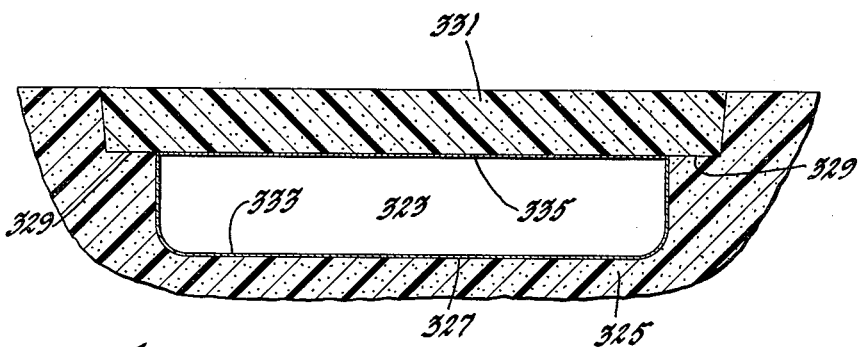

FIGURES 7a and 7b are the lower and upper portions of a front sectional view of a bottom freezer refrigerator embodying a second form of my invention taken substantially along the lines 7a—7a and 7b—7b of FIGURES 8a and 8b respectively;

FIGURES 8a and 8b are the bottom and top portions of a side sectional view with the shelves and meat container shown in dot-dash outline taken substantially along the lines 8a—8a and 8b—8b of FIGURES 7a and 7b respectively;

FIGURE 9 is a fragmentary side sectional view taken along the line 9—9 of FIGURE 7a; and FIGURE 10 is a fragmentary bottom sectional view of one of the ducts taken along the line 10—10 of FIGURE 7a.

Referring now to the drawings and more particularly to FIGURES 1 to 4, there is shown an insulated refrigerator cabinet 20 provided with an upper below-freezing compartment 22 enclosed within an inner liner 24 and a lower above-freezing compartment 26 enclosed within an inner liner 28. The compartment 22 is closed by an insulated door 30. The compartment 26 is closed by an insulated door 32. The below-freezing compartment 22 is provided with a false sheet metal bottom wall 34 which rests on the tops of the vertical fins of the evaporator 36. The bottoms of the vertical fins of the evaporator 36 rest upon the bottom 38 of the liner 24. The front of the false bottom wall 34 is spaced from the door 30 and the bottom 38 as well as the door jamb 40 to provide a centrally located entrance 42 for the cold air from the below-freezing compartment 22. This entrance 42 leads to the evaporator compartment 44 which is located between the false bottom wall 34 and the bottom 38 of the liner 24.

Figure 1:
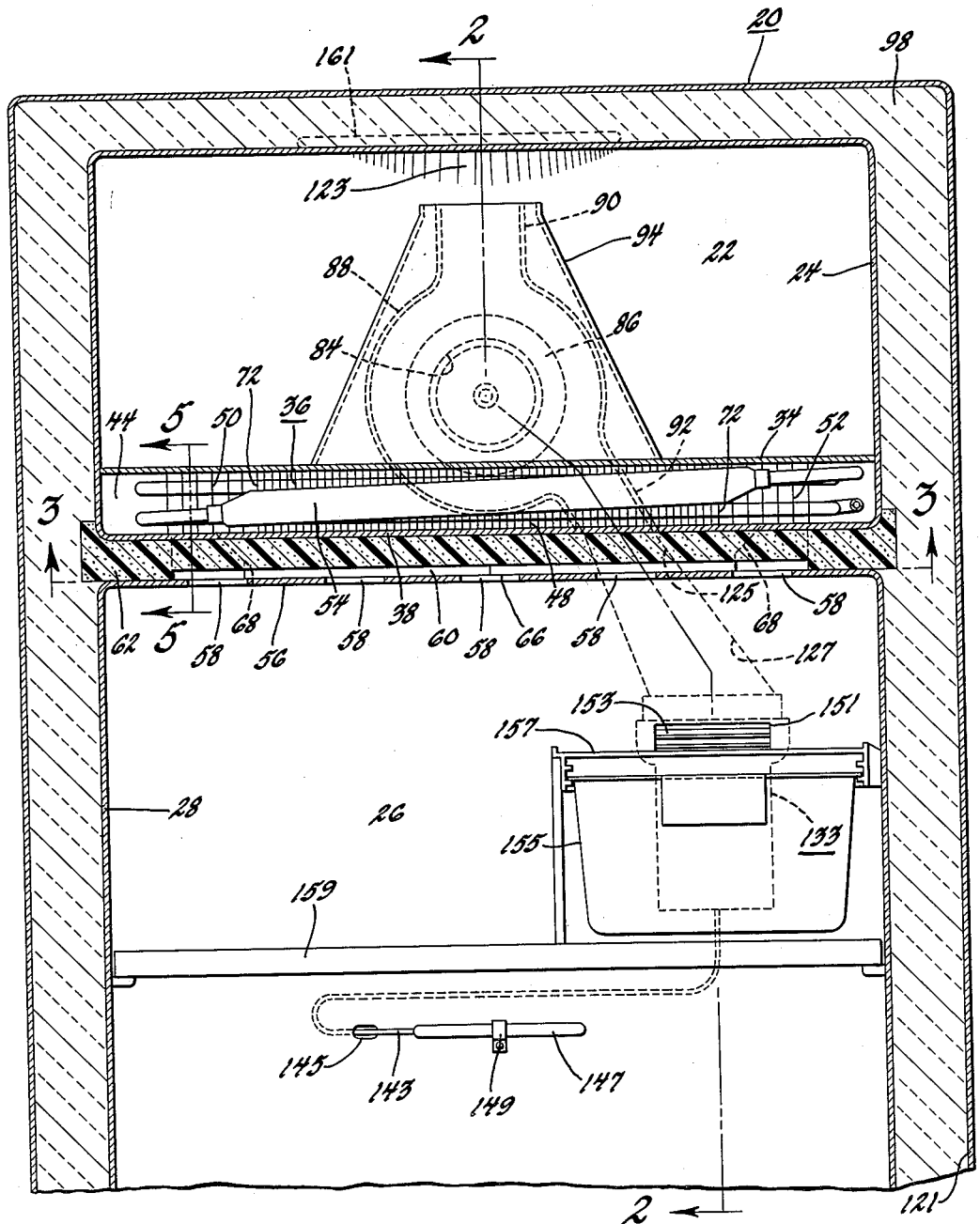
FIGURE 1 is a front vertical sectional view taken along the line 1—1 of FIGURE 2 of a top freezer refrigerator embodying one form of my invention.
Figure 2:
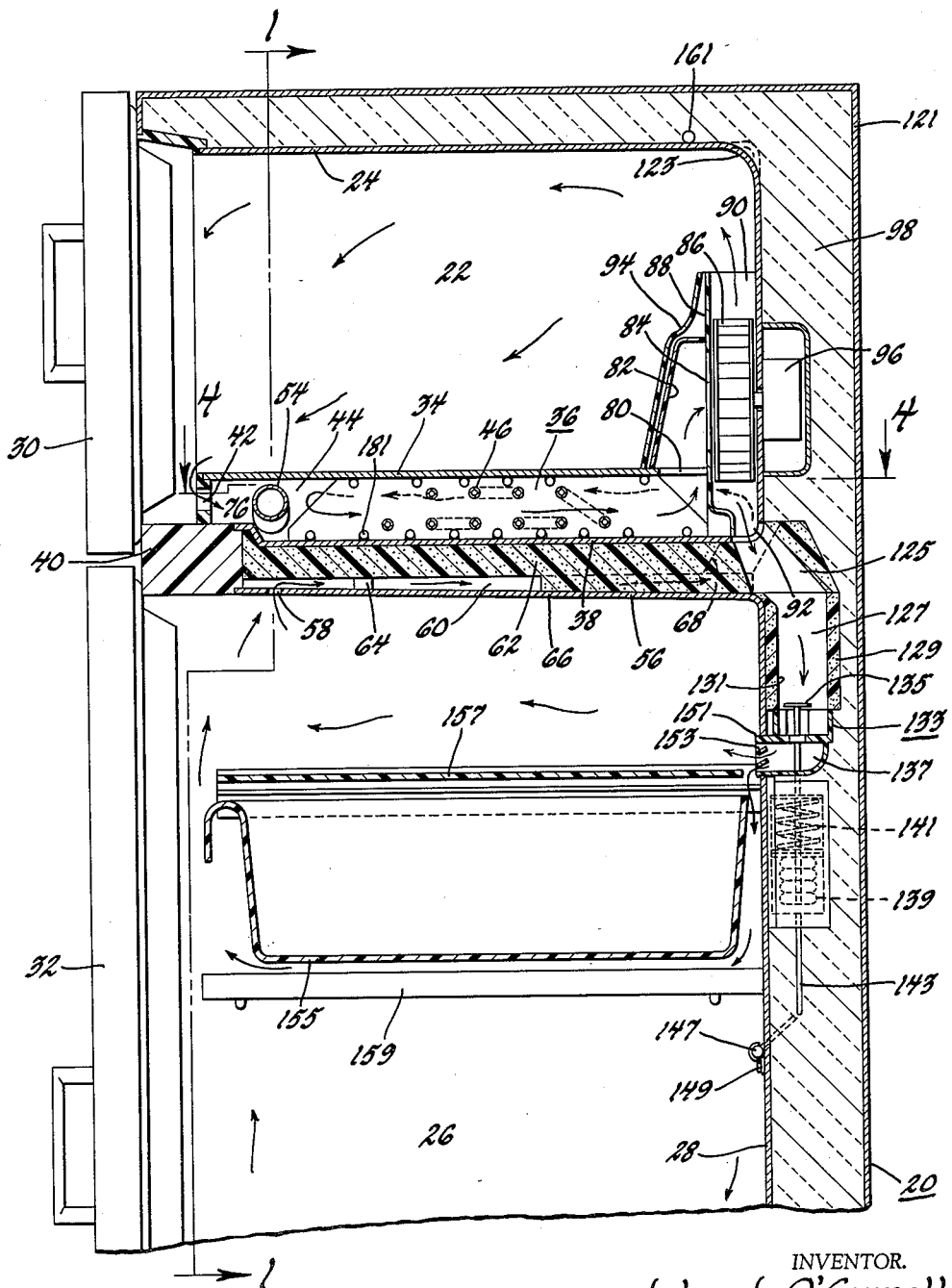
FIGURE 2 is a side vertical sectional view taken along the lines 2—2 of FIGURE 1.
Figure 3:
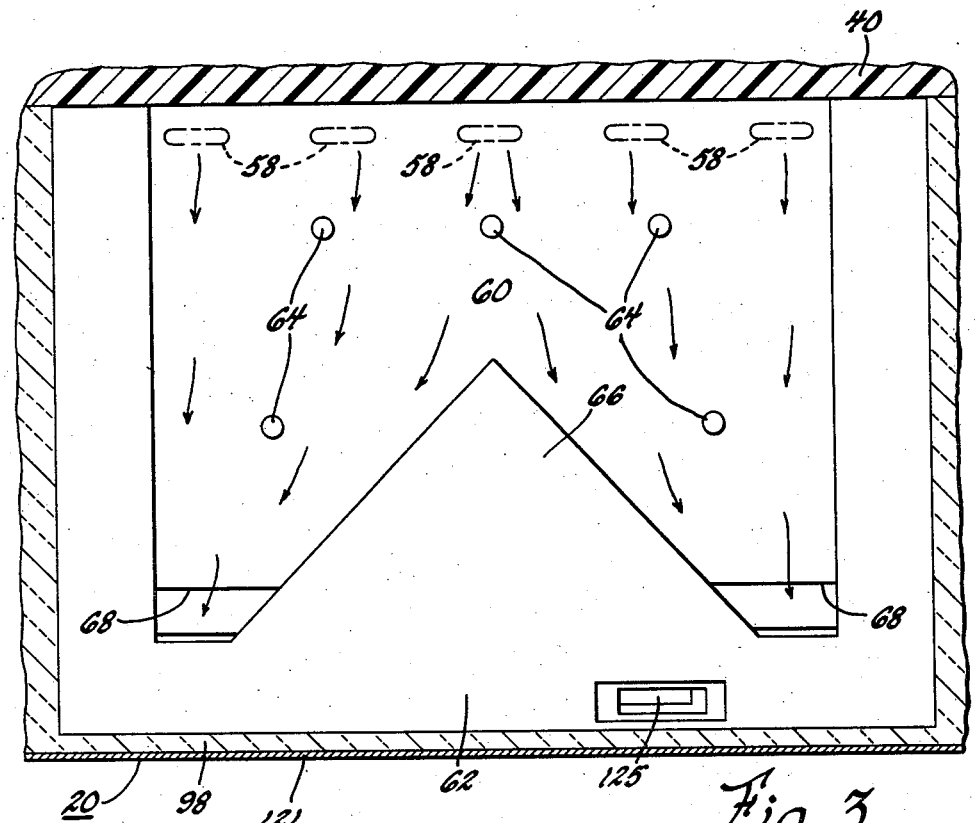
FIGURE 3 is a fragmentary bottom sectional view taken along the line 3—3 of FIGURE 1.
Figure 5:
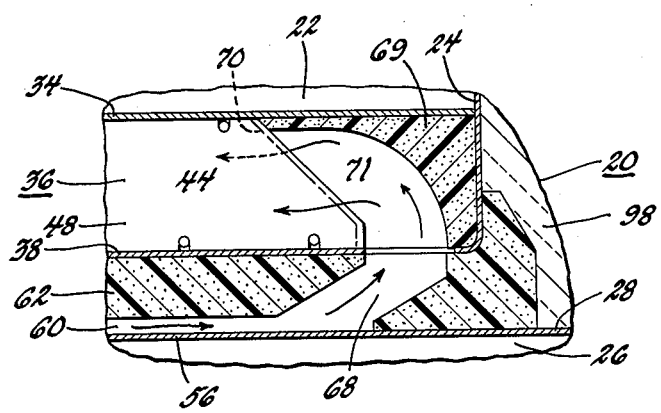
FIGURE 5 is a fragmentary side sectional view taken along the line 5—5 of FIGURE 1.

The evaporator 36 includes serpentine refrigerant tubing extending horizontally from side to side within the evaporator compartment 44 provided with a central or middle section of vertical closely spaced fins 48 and end sections 50 and 52 of more widely spaced vertical fins. The front and rear edges of the fins are preferably all bevelled substantially from top to bottom as shown in FIGURES 2 and 5 to facilitate defrosting. The outlet of the evaporator is connected to an accumulator 54 extending from side to side at a slight angle across the front of the evaporator compartment 44 in front of the evaporator 36.

The top wall 56 of the inner liner 28 of the above-freezing compartment 26 is provided with five slots 58 just behind the door jamb 40. Air from the above-freezing compartment 26 is drawn through these slots 58 into a thin wide divided passage 60 located between the top wall 56 and a cast insulating member 62 located between the top wall 56 of the liner 28 and the bottom wall 38 of the liner 24. The spacing of the top wall 56 from the insulation slab 62 is maintained by the round projection 64 and the V-shaped projection 66 which divides the flow of air at the rear of the space so as to guide it into the upwardly extending apertures 68 at the rear corners. At the inner sides of the apertures 68, the evaporator compartment 44 is provided with a set of dividers 70 extending forwardly from the rear of the evaporator compartment 44 into contact with the rear edge of each of the fins 72 which separate the closely spaced central fins 48 from the wider spaced side fins 50 and 52. Over each of the apertures 68 within the evaporator compartment 44 are the insulation pieces 69 which insulate from the false bottom wall 34 and the below-freezing compartment 22 the warm air passing upwardly from the apertures 68 through the curved recesses 71. The curved recesses 71 in the insulation pieces 69 are aligned with the apertures 68 and the adjacent ends of the widely spaced fins 50 and 52 so as to align the air with the fins and to prevent the air from passing between ends of the evaporator and the sides of the compartment 44. The insulation pieces 69 at the bottom and the rear fit the liner 24 and at the top and front fit the false bottom wall 34 and the bevelled edges of the fins 50 and 52 for the confinement and direction of this warm air. The dividers 70 and the fins 72 divide the evaporator compartment 44 into two side passages 74 located between the dividers 70 and the fins 72 and the side walls of the evaporator compartment 44 extending forwardly from the apertures 68.

The air from the above-freezing compartment therefore flows from this compartment up through the apertures 58 and rearwardly through the thin divided passage 60 above the top wall 56 to and up through the apertures 68 in the insulation slab 62 into the side passages 74 of the evaporator compartment 44 where the air flows forwardly between the widely spaced fins 50 and 52 until it reaches the front end of the evaporator compartment 44. Because of its warm condition (34°–37° F.), there is a large temperature differential between this air and the fins 50 and 52, making possible the reduction in their number. Here, there is a space or passage 76 in front of the evaporator 36 wherein the air after flowing forwardly through the side passages 74 mixes with the air flowing rearwardly through the apertures 42 into the evaporator compartment 44. The dividers 70 and the fins 72 form the side boundaries of a central passage 78, embracing the closely spaced fins 48, which carries the air rearwardly to the rear of the evaporator compartment 44.

The rear edge of the false bottom wall 34 is provided with a large centrally located notch 80 forming the outlet to the evaporator compartment 44. It is covered by the inlet shroud 82 which also encloses the inlet opening 84 of a centrifugal fan 86 located just in front of the rear wall of the below-freezing compartment liner 24 as shown in FIGURE 2. The centrifugal fan 86 is enclosed in a scroll 88 of plastic having an upwardly extending discharge outlet 90 and a diagonally downwardly extending discharge outlet 92. The inlet shroud 82 and the scroll 88 as well as the discharge outlet 90 are enclosed in an ornamental cover 94 of plastic which serves to prevent air from gaining access to the surfaces of these members so as to prevent the deposit of frost thereon. The centrifugal fan 86 is driven by the electric motor 96 mounted in the recess in the insulation 98 located between the inner liner 24 and the outer sheet metal wall 121 of the cabinet 20.

The air discharged from the outlet 90 impinges against the large fillet 123 at the meeting edges of the top and rear walls of the inner liner 24 directly above the outlet 90. This distributes the air substantially uniformly throughout the compartment 22 so that all parts of this compartment 22 are maintained substantially at the same temperature. The second downwardly directed discharge outlet 92 connects with the passage 125 extending downwardly through the rear of the insulation slab 62 and connecting with the passage 127 in the insulation piece 129. These insulation pieces 62 and 129 are preferably molded of polyurethane foam or foamed polystyrene and have the passages preferably lined and sealed with bright aluminum foil 131 as shown in FIGURE 10. The liner 28 is prevented from sweating by the front wall of the insulation piece 129 which insulates it from the cold air in the passage 127.

Positioned beneath the insulation piece 129 is a plastic valve housing 133 provided with a rectangular valve 135 connected to an operating rod 137 operated by a bellows 139 under the control of a spring 141. All of this valve structure is mounted within the insulation 98 between the rear of the liner 28 and the outer rear wall 121. The bellows 139 is operably connected through the capillary tube 143 which extends through the insulation 98, and through an aperture 145 in the rear wall of the liner 28 and connects with a thermostat bulb 147 fastened beneath the shelf 159 to the rear wall by a clip 149. This valve structure is calibrated to close the valve 135 when the bulb 147 is cooled to 33° F. and to fully open the valve 135 when the bulb 147 reaches 37° F. The valve housing 133 has a discharge nozzle 151 provided with downwardly directing deflectors 153, projecting forwardly through the rear wall of the liner 28 directly over the meat container 155 which is slidably mounted beneath the impervious small shelf 157. This shelf 157 and the container 155 may be made of some form of plastic or metal. The small shelf 157 is supported upon the full width shelf 159 located above the thermostat bulb 147.

The evaporator 36 is operatively connected to a motor-compressor condenser unit (represented by the motor 165 in FIGURE 6) which is controlled by a cycling thermostat switch (not shown) (represented diagrammatically by the switch 163 in FIGURE 6) which is operated to closed position when its thermostatic bulb 161, located on top of the liner 24 above the outlet 90 of the fan 86, reaches a temperature of +11° F. and which causes the opening of the switch when it reaches a temperature of −2° F. This control of the motor-compressor condenser unit as well as the operation of the fan 86 maintains the below-freezing compartment 22 at desirable temperatures at all times without any formation of frost within the compartment 22. The compartment 26 is maintained at a proper temperature by the valve 135 under the control of the bulb 147 which restricts the flow of cold air into the compartment 26 sufficiently to prevent the attainment of freezing temperatures therein and preferably to maintain a temperature of about 35° to 37° F.

The relatively widely spaced fins 52 and 50 provide considerable areas allowing for the free flow of air through the side passages 74 from the above-freezing compartment, even though considerable frost may collect thereon. This air in flowing forwardly through the passages 74 will be cooled and dried to that, when it and the air from the below-freezing compartment 22 reaches the closely spaced fins 48 in the central passage 78, the deposit of frost in the central or middle section will be very slow and very small.

Figure 6:
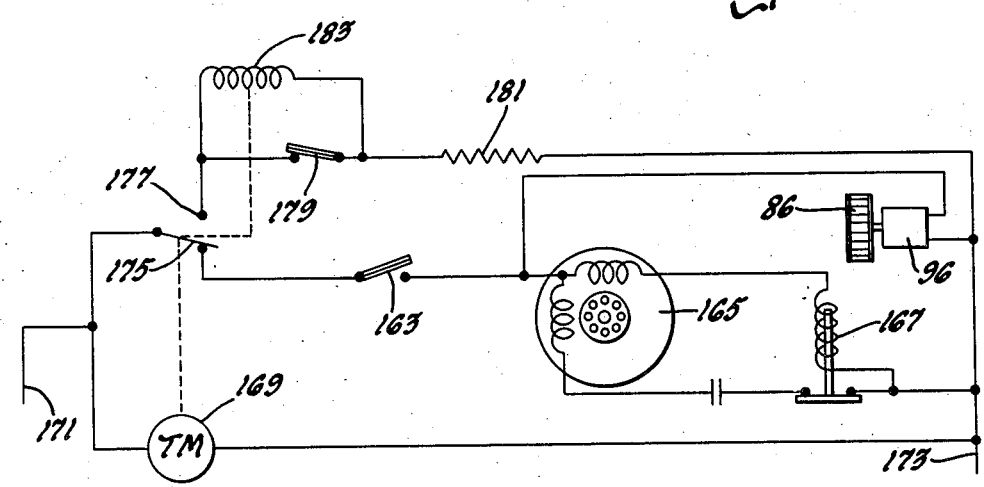
FIGURE 6 is a wiring diagram for the refrigerator shown in FIGURES 1 to 5, but it is also applicable to the refrigerator shown in the following FIGURES 7 to 10.
Figure 4:
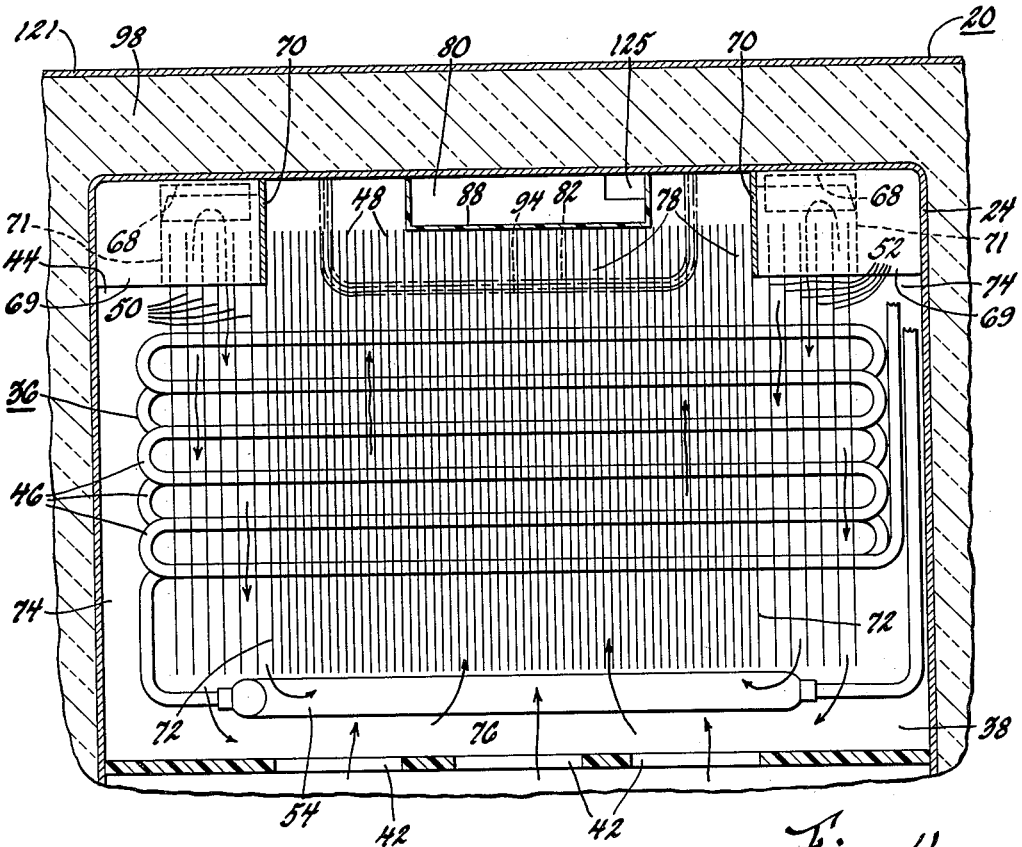
FIGURE 4 is a top horizontal sectional view taken along the line 4—4 of FIGURE 2.

The control system is shown diagrammatically in FIGURE 6. The thermostat bulb 161 controls the operation of the switch 163 which in turn controls the operation of the motor 165 which drives the compressor. The motor 165 is provided with a conventional starting relay 167. The fan motor 96 is connected in parallel with the compressor motor 165 and is also under the control of the main switch 163. In time, sufficient frost builds up upon the evaporator 36 that defrosting is desirable. Accordingly, a timer motor 169 is connected across the supply conductors 171 and 173. Periodically, such as once or twice a day, the timer motor 169 operates the switch 175 from the lower position connecting with the switch 163 to an upper position connecting with the contact 177. This contact 177 connects through the normally closed bimetal switch 179 with an electric heater 181 connecting with the supply conductor 173. As shown in FIGURE 2, the electric heater 181 is of the sheathed tubular type and is lodged in grooves in the tops and bottoms of the fins of the evaporator 36. When the switch 175 is moved from its lower position to the upper position by the timer motor 169 into contact with the contact 177, the motors 165 and 96 are disconnected and the heater 181 is energized to raise the temperature of the evaporator 36 above the freezing point to melt the frost therefrom. When the defrosting is completed, the rise in temperature of the evaporator will cause the opening of the bimetal switch 179 which is mounted in a portion of the evaporator 36 at which the frost disappears last. The opening of this switch 179 causes the energization of the electromagnet 183 which operates the switch 175 back to its lower position to deenergize the heater 181 and to reenergize the motor 165 and the fan motor 96. This restores the system to normal operation.

The bottom freezer form of refrigerator shown in FIGURES 7 to 10 includes an insulated refrigerator cabinet 220 containing an upper above-freezing compartment 222 enclosed within a metal liner 224 surrounded by the heat insulation 226. Beneath the above-freezing compartment 222 is the below-freezing compartment 228 enclosed within the liner 230. The insulation 232 thermally separates the compartments 222 and 228. Separate doors 234 and 236 are provided for the compartments 222 and 228, respectively. A mullion 238 is provided in front of the insulation 232 for sealing the door openings. The below-freezing compartment 228 is provided with a false bottom wall 240 which rests upon the tops of the vertical fins of the evaporator 242 which is identical to the evaporator 36 of the first embodiment. This evaporator 242 rests upon the bottom 244 of the liner 230.

In front of the evaporator 242 is an accumulator 246 connected by the suction line 248 with the sealed motor-compressor unit 250 containing an electric motor similar to 165 shown in FIGURE 6. The motor-compressor unit 250 delivers the compressed refrigerant to the condenser 252 from which the condensed refrigerant is forwarded through a restrictor 254 to the inlet of the serpentine refrigerant tube of the evaporator 242. The front edge of the false bottom wall 240 is provided with three inlet openings 256 similar to the openings 42 in FIGURE 4. These are located in front of the closely finned section 258, constituting the central or middle portion of the evaporator 242. The bottom corners of the rear wall 260 of the above-freezing compartment 222 are provided with the louvered air outlet grilles 262 which conceal the outlet openings connecting with the downwardly extending air passages which are formed in the cast foam insulation slab 266 covering substantially the lower half of the rear wall of the cabinet 220. Similarly to FIGURE 10, the passages 264 are formed by providing shouldered grooves in the slab 266 and lining them with bright aluminum foil 333 and closing them by additional cast pieces 268 of foam insulation. These pieces rest upon the shoulders of the grooves and are also lined with bright aluminum foil 335 to enhance their insulating and confining properties. The pieces 268 insulate the air in the passage 264 from the cold wall of the liner 230.

The bottoms of the passageways 264 are directed diagonally downwardly and forwardly into a bevelled insulation piece 270 provided with a passage 272 which is substantially perpendicular to the bevelled rear edges of the widely spaced fins 274 in the end sections of the evaporator 242. This arrangement minimizes the formation of any frost in the passage 272. It also insures the defrosting of the leading edge of the evaporator 242 during any defrosting period. The warm humid air from the passages 272 moves forward through the side passages 276 which embrace the widely spaced fins in the edge portions 274 of the evaporator 242. Here, the air is dried by the deposit of frost upon the widely spaced fins 274 as it is cooled before it reaches the front of the evaporator compartment 278 located between the false bottom wall 240 and the bottom wall 244. At the front where the accumulator 246 is located, this cooled and dried air joins the air from the below-freezing compartment 228, entering through the three openings 256 for combined rearward flow through the closely spaced fin section 258 in the central portion of the evaporator compartment to the rear thereof.

The rear edge of the false bottom wall 240 is provided with a large central notch 280 which is covered by the inlet shroud 282 connecting with the inlet 284 of the centrifugal fan 286 driven by the electric motor 288 corresponding to the electric motor 96 and the fan 86 of FIGURE 6. The fan 286 is enclosed within a scroll 290. The scroll 290 is provided with a dual discharge outlet 292. One portion discharges directly upwardly, and the outer portion thereof impinges upon the deflector 294. The remainder impinges upon the large fillet 296, provided between the rear wall and the top wall of the inner liner 230, at the center point thereof diminishing toward the sides. This arrangement distributes the discharge of cold air throughout the below-freezing compartment 228 so that all portions thereof are maintained at substantially the same temperature, for example, below 11° F. The rear wall of the discharge portion 292 opens into the passage 298 in the central portion of the insulation slab 266 as shown in FIGURE 8a. This passage 298 is formed as a groove in the central upper portion of the insulation piece 266 which is provided with shoulders upon which rests the piece 321. These pieces are also lined with bright metal foil to provide a suitable lining for the passage 298.

The passage 298 connects with a passage 323 in an insulation slab 325 of polyurethane foam in the rear wall behind the above-freezing compartment 222. As shown in FIGURE 10, this passage 323 is formed by providing the groove 327 in the insulation piece 325 together with the recessed shoulders 329 which support the insulation piece 331 also of foam insulation. The insulation piece 331 prevents sweating of the inner liner 224 by insulating the liner from the cold air in the duct 323. The groove 327 is lined with the bright metal foil 333, and the face of the piece 331 is likewise lined with bright metal foil 335. Preferably, this foil is of two-thousandths bright aluminum. The passage 323 is provided with a right turn into the end of the valve housing 337 which is mounted horizontally within the insulation piece 325. The valve housing 337 is a part of a thermostatic valve 339 which is similar to the valve housing 133 but which is provided with an exit 341 on the upper narrow side. The valve 339 is arranged with its axis horizontal and its exit 341 on its upward face so as to minimize the changes in direction of the air. The exit 341 connects with a diverging passageway 343 extending upwardly in the insulation piece 325. This passageway is formed in a manner similar to that illustrated in FIGURE 10 and is lined with bright aluminum foil.

This passageway 343 extends up to a discharge outlet 345 which discharges forwardly over the meat container 347 slidingly supported beneath the small shelf 349 which in turn is supported by the large shelf 351 beneath the meat container 347. The discharge of cold air from the outlet 345 is sufficient to keep the meat container 347 at a desirable temperature, such as 30° F. The passage 343 has an extension 353 extending to an outlet 355 located in the upper central portion of the rear wall of the liner 224. This outlet 355 discharges forwardly and insures adequate cooling of the top of the compartment 222. The cold air also falls down through the compartment 222, insuring the cooling of the remainder of the compartment, and leaves the compartment through the louvered outlets 262.

The temperature of the compartment 222 is regulated by the thermostat bulb 359 mounted by the bracket 361 onto the rear wall of the inner liner 224 beneath the shelf 351. The bulb 359 is connected through an aperture 363 in the rear wall of the liner 224 by a capillary tube 365 connecting with the operating bellows 367 of the valve 339. Like the valve 135, the valve 339 is set to be fully open when the bulb 359 is at 37° F. and to be fully closed when the bulb 359 is at 33° F. This prevents freezing within the above-freezing compartment 222 as well as in the container 347. The evaporator is defrosted from time to time under the control of a system such as is shown in FIGURE 6. The operation of the sealed motor-compressor unit 250 is controlled by a switch, operated in accordance with the temperatures of a thermostat bulb 369 mounted above the top wall of the inner liner 230 just in front of the fillet 296 so that it is cooled by the blast of cold air discharged from the discharge outlet 292. The liner 230 may be provided with a small well for the bulb 369 as shown in FIGURE 8a.

The top and bottom edges of the fins of the evaporator 242 are notched to receive the electric defrost heater 371 which corresponds to the defrost heater 181 in the wiring diagram, FIGURE 6. The rear of the evaporator compartment 278 is provided with dividers similar to the dividers 70 in FIGURE 4 which extend into substantial sealing engagement with the fins corresponding to the fins 72 which divide the central closely spaced fin section 258 from the widely spaced fin sections 274. The switch operated by the thermostat bulb 369 is preferably set to close at +11° F. and to open at −2° F. to maintain the compartment 228 at temperatures below 11° F. The insulation of the passages 323, 343 by preventing the direct cooling of the liner 224 of the above freezing compartment 222 provides for more uniform temperatures in this compartment 222 by allowing the air discharged at the top to control the temperature of the compartment rather than to let it be controlled by the air passing through the passages 323, 343 over the cold liner area in the back of the compartment 222.

While the embodiments of the present invention as herein disclosed constitute preferred forms, it is to be understood that other forms might be adopted.

What is claimed is as follows:

1. A refrigerator including insulating means enclosing a below-freezing compartment and an above-freezing compartment and door means for access to said compartments, means associated with said insulating means forming an extensive thin generally rectangular evaporator compartment, a generally rectangular evaporator comprising refrigerant tubing with transverse fins extending within said evaporator compartment, means dividing said evaporator compartment into a first common passage having an inlet for mixed air from the below and above-freezing compartments embracing and carrying the mixed air through a first section constituting the greater finned portion of the evaporator and also having an outlet and a second passage solely for above-freezing compartment air embracing and carrying the above-freezing compartment air through a second finned section of the evaporator and including one finned edge of the evaporator and connecting at one end with the above-freezing compartment and connecting at the opposite end with said inlet of said first passage, said inlet of said first passage also communicating with the below-freezing compartment for receiving air therefrom, fan means having its inlet connected to said outlet of said first passage and having outlet means connected to said above and below-freezing compartments.

2. A refrigerator including insulating means enclosing a below-freezing compartment and an above-freezing compartment and door means for access to said compartments, means associated with said insulating means forming an extensive thin generally rectangular evaporator compartment, a generally rectangular evaporator comprising refrigerant tubing with transverse fins extending within said evaporator compartment, said evaporator including a central closely finned portion and widely spaced finned edge portions, means dividing said evaporator compartment into a central common passage embracing the central closely finned portion of the evaporator and having an inlet and an outlet adjacent opposite edges of the evaporator and side passages embracing the other widely spaced finned edge portions of said evaporator and each connected at one end to the inlet of said central portion and extending at the other end to one of two corners of said evaporator compartment, said insulating means including passages extending from said below-freezing compartment to said two corners of said evaporator compartment, and means for drawing air from said outlet of said central passage and discharging the air into said below and above-freezing compartments.

3. A refrigerator including insulating means enclosing a lower below-freezing compartment and an upper above-freezing compartment and door means for access to said compartments, said below-freezing compartment being provided with a false bottom wall and an evaporator compartment containing an evaporator beneath said false bottom wall and a passage extending between said below-freezing and evaporator compartments, said insulating means including a piece of substantially rigid insulating material behind the below-freezing compartment, a fan located at the rear of the below-freezing compartment having its inlet connected to the rear of said evaporator compartment and having a dual outlet with one portion discharging into the below-freezing compartment and a second portion, said piece of insulating material including a second passage extending upwardly from said second portion and a third passage extending from said above-freezing compartment downwardly to said evaporator compartment, said insulating means including a fourth passage extending from said second passage to said above-freezing compartment.

4. A refrigerator including insulating means enclosing a lower below-freezing compartment and an upper above-freezing compartment and door means for access to said compartments, said below-freezing compartment being provided with a false bottom wall and an evaporator compartment containing an evaporator beneath said false bottom wall and a passage extending between said below-freezing and evaporator compartments, said insulating means including a piece of substantially rigid insulating material behind the below-freezing compartment, a fan located at the rear of the below-freezing compartment having its inlet connected to the rear of said evaporator compartment and having a dual outlet with one portion discharging into the below-freezing compartment and a second portion, said piece of insulating material being provided with a wide groove having shoulders extending upwardly from said second portion, and a second piece of substantially rigid insulating material extending across said groove and mounted upon said shoulders to form a duct extending upwardly from said second portion, said insulating means also having a passage extending from said groove to said above-freezing compartment and a passage extending from said above-freezing compartment to said evaporator compartment.

5. A refrigerator including insulating means enclosing a below-freezing compartment and an above-freezing compartment and door means for access to said compartments, means associated with said insulating means forming an evaporator compartment containing an evaporator, said evaporator comprising refrigerant tubing with transverse fins provided with beveled ends, and insulating means being provided with duct means extending from said above-freezing compartment directly onto said beveled ends of said fins, the portion of said duct means nearest said fins being located directly over the beveled ends of said fins, and means for circulating air from said above-freezing compartment through said duct means and from said below-freezing compartment through said evaporator compartment and said evaporator back to said below and above-freezing compartments.

References Cited in the file of this patent

UNITED STATES PATENTS

| | | |
|---|---|---|
| 2,044,600 | Williams | June 16, 1936 |
| 2,150,182 | Munters | Mar. 14, 1939 |
| 2,633,714 | Wehby | Apr. 8, 1953 |
| 2,641,111 | Bishop | June 9, 1953 |
| 2,669,850 | Bishop | Feb. 23, 1954 |
| 2,712,731 | Dills | July 12, 1955 |
| 2,742,766 | Buchanan | Apr. 24, 1956 |
| 2,907,180 | Mann | Oct. 6, 1959 |
| 2,929,229 | Detwiller | Mar. 22, 1960 |
| 2,960,849 | O'Connell | Nov. 22, 1960 |
| 2,994,209 | Mann | Aug. 1, 1961 |
| 3,009,338 | Dobbie | Nov. 21, 1961 |
| 3,020,733 | Hubacker | Feb. 13, 1962 |
| 3,027,732 | Mann | Apr. 3, 1962 |